April 11, 1961 A. ARUTUNOFF 2,979,347
CENTRIFUGAL PRESSURE SEAL FOR ROTARY SHAFTS
Filed Nov. 19, 1956

INVENTOR
ARMAIS ARUTUNOFF

BY

ATTORNEY 2,979,347
Patented Apr. 11, 1961

2,979,347

CENTRIFUGAL PRESSURE SEAL FOR ROTARY SHAFTS

Armais Arutunoff, Bartlesville, Okla., assignor to Reda Pump Company, Bartlesville, Okla., a corporation of Delaware Filed Nov. 19, 1956, Ser. No. 622,994

7 Claims. (Cl. 286—7)

This invention relates to a sealing device for high speed rotary shafts such as embodied in submergible, oil filled electric motors. More particularly, the invention consists in new and useful improvements in a centrifugal pressure seal which during the operation of an electric motor creates a pressure barrier along the shaft, acting in opposition to the oil pressure within the motor resulting from expansion due to a temperature rise incident to the operation of the motor, the hydrostatic differential pressure due to difference in specific gravities of oil inside of motor versus water outside of motor and elastic forces of the compensating means.

Ordinarily, submergible, oil filled electric motors installed in connection with a coaxial pump assembly, are provided with some means to compensate for the normal expansion and contraction of the lubricating and protecting medium with which the motor housing is filled. An example of such a device is illustrated and described in my Patent No. 2,674,702, issued April 6, 1954, and although the present invention is particularly adaptable to a unit of this nature, its utility is by no means limited to such an installation. Despite the compensating effect of the protecting unit in these installations, it is desirable to provide an effective seal at the upper end of the motor shaft so as to preserve the original charge of protecting fluid while the motor is in operation and to prevent the sucking in of water or other surrounding well fluid when the motor stops and the protecting oil contracts.

It is an object of the present invention to provide a seal of this character which is operated by the rotation of the motor shaft to create a centrifugal pressure or barrier along the shaft during the rotation of the latter and including a mechanical sealing device operating in conjunction with the centrifugal pressure seal to prevent leakage along the shaft when the motor is stopped.

Another object of the invention is to provide a device of this type which may be installed in a conventional oil filled electric motor in place of the usual upper shaft seal and without requiring alterations of the motor assembly.

A further object is to provide a centrifugal pressure seal which may be employed with a conventional mechanical sealing device.

With the above and other objects in view which will appear as the description proceeds, the invention consists in the novel features herein set forth, illustrated in the accompanying drawings and more particularly pointed out in the appended claims.

Figure 1:
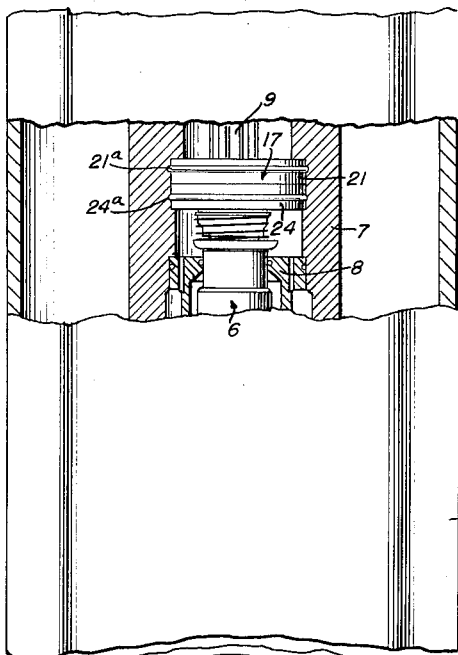

Referring to the drawings in which numerals of like character designate similar parts throughout the several views, Figure 1 is a view in side elevation, showing a motor unit with the walls of the housing broken away to disclose the centrifugal pressure seal and the protecting or compensating unit.

Figure 2:
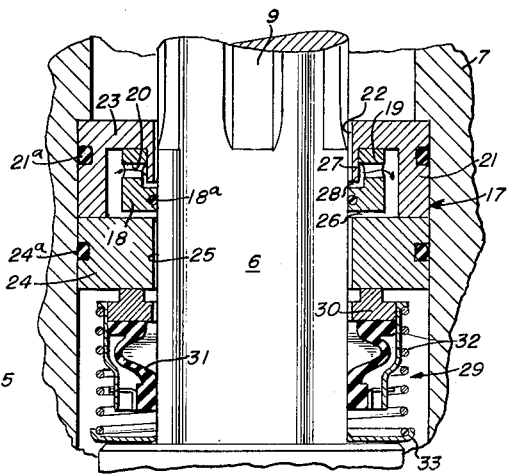
Figure 3:
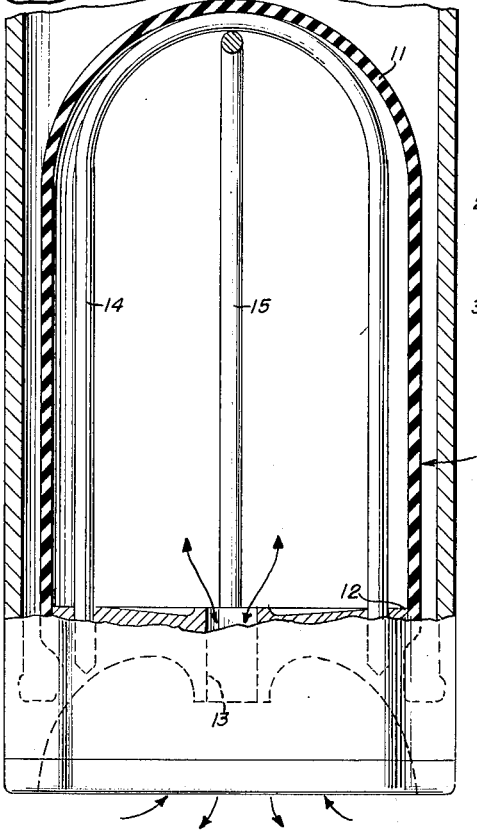
Figure 3:
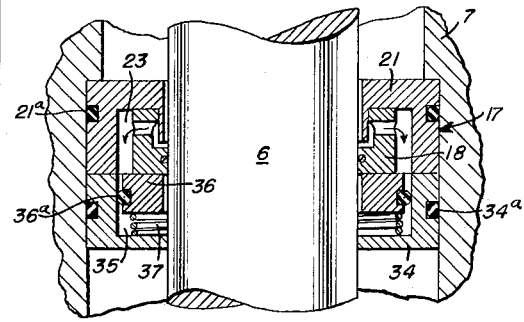

Figure 2 is an enlarged longitudinal sectional view of one form of centrifugal pressure seal, and Figure 3 is a similar view of a modified form of seal.

In the drawings, referring first to Figure 1, 5 represents a cylindrical motor housing which is coaxially mounted adjacent to the lower end of the casing of a pumping unit (not shown). Within the housing 5, the motor shaft 6 of a vertical type electric motor is supported in a bearing sleeve 7 by means of conventional bearings 8, the upper end of the shaft 6 being splined as at 9 for coupling to the coaxial shaft of a pump unit located above.

Within the lower end of the motor housing 5 is a compensator or protecting device generally represented by the numeral 10 and which may be of any suitable design. In the form of the invention here illustrated, the protecting unit is of the type shown and described in my former Patent No. 2,674,702, comprising a collapsible diaphragm or breather bag 11 formed of neoprene or any suitable material having the properties of flexibility and immunity from attack by oils and chemicals. The bag 11 is suitably secured at its lower end as at 12, to the bottom of the housing 5, surrounding an opening 13 in the bottom of the housing. The dome-like upper end of the bag rests upon a pair of wicket supports 14 and 15 which are vertically mounted within the bag by means of drilled holes in the bottom of the housing 5.

In the use of a motor and pump assembly of the type here involved, the motor housing 5 is filled with a suitable lubricating and protecting fluid such as transformer oil, the weight of which causes the walls of the bag 11 to collapse to a certain degree into contact with the supporting wickets 14 and 15. The interior of the bag 11, being in communication with the surrounding well fluid through opening 13, becomes filled with said fluid.

Thus, the collapsible diaphragm or bag 11 is responsive to the pressure differential between the lubricating and protecting fluid within the housing and the surrounding well fluid, as explained in my said former patent. It will be understood that my reference to said former patent is purely for the purposes of illustration as the present invention is in no way restricted to use with a compensator of this particular type.

As before indicated, the improved centrifugal pressure seal of the present invention is intended to cooperate with a protecting or compensating device in preventing the escape of protecting fluid along the motor shaft so that the compensator will function with a maximum effect and the original charge of protecting fluid in the motor housing will be preserved. The centrifugal pressure seal is generally indicated by the numeral 17 and referring first to the form of the invention shown in Figure 2, an annular impeller 18 is mounted on the shaft 6 just below its splined upper end 9, a flexible O-ring 18a being interposed between the impeller and the periphery of the shaft 6 to insure rotation of the impeller with the shaft and seal their opposed surfaces. The impeller is provided with an upstanding annular flange 19 which is radially spaced from the boundary of the shaft engaging opening of the impeller and is provided with a series of annularly spaced radial ports 20 which extend entirely therethrough.

Enclosing the impeller unit 18 is an annular impeller housing 21 having a central opening 22 which receives the shaft 6 with a rotating clearance. The housing 21 is internally recessed to provide an annular chamber 23 which encloses the impeller 18, the radial dimensions of said chamber being greater than those of the impeller, so as to provide an annular pressure space around the periphery of the upstanding flange 19. A fixed sealing ring 24 abuts the lower extremity of the impeller housing 21 and serves as a bottom closure for the chamber 23, said ring having a central opening 25 which receives the shaft 6 with a rotating clearance. In this form of centrifugal pressure seal, the vertical dimension of the impeller 18 is slightly less than the corresponding dimension of the chamber 23, so as to provide an annular clearance 26 between the impeller and the adjacent face of the sealing ring 24, said clearance 26 communicating with the clearance 25 between the ring 24 and the shaft 6.

In effect, when the device is assembled, the impeller housing 21 and the sealing ring 24 form the boundaries of the chamber 23 and are maintained in fixed relation to the bearing sleeve 7 by flexible O-rings 21a and 24a respectively, which also act to seal the housing and ring 24 with respect to the bore of sleeve 7. Preferably, a vertical annular flange 27 bounds the upper portion of the chamber 23 adjacent the shaft 6 with a continuation of the clearance 22 therebetween, said flange terminating in spaced relation to the body of the impeller 18 to provide a clearance 28, leading from the clearance 22 to the radial ports 20 in the upstanding impeller flange 19.

A conventional mechanical sealing assembly, generally indicated by the numeral 29, cooperates with the sealing ring 24 for sealing the shaft 6 with respect to the bore of the bearing sleeve 7. This assembly generally consists of a sealing ring 30, arranged in sealing engagement with the underside of the ring 24 and rotatably secured to the shaft 6 by a conventional bellows type diaphragm 31, a coil spring 32 being interposed between the ring 30 and a retaining cup 33, fixed to the shaft 6, for normally urging the ring 30 into sealing engagement with the ring 24.

As before stated, when in operation the motor housing 5 is filled with a lubricating and protecting fluid which completely surrounds the motor and rises in the bore of the bearing sleeve 7 up to the stationary sealing ring 24. During the operation of the motor, the lubricating and protecting fluid in the housing 5 expands due to the increased temperature of the motor, and the major compensation for this expansion is taken care of by the flexible bag or diaphragm 11 which collapses into the spaces between the wickets 14 and 15, forcing any well fluid which is in the bag, outwardly through the opening 13. However, there is a tendency for the expanding oil to seek passage along the shaft 6 at the upper end of the bore of the bearing sleeve 7.

At this point the centrifigal pressure seal 17 performs its function in creating a pressure barrier at the upper end of the shaft. As the shaft 6 rotates, the impeller 18 rotates therewith and by means of the centrifugal force developed by the radial ports 20 creates a pressure in the annular chamber 23 which acts downwardly through the clearances 26 and 25, opposing the pressure or expanding force of the oil in the housing which is seeking passage between the mehcanical sealing rings 24 and 30. It must be noted that the diameters of the impeller 18 are so dimensioned that the centrifugal pressure developed by it at best, counterbalances the pressure of the oil in the motor housing but is not enough to pump into it any liquid through clearance 22. Thus, the full benefit of the compensating diaphragm 11 is maintained and a substantial part of the original charge of protecting and lubricating fluid in the housing 5 is preserved.

After the motor is stopped, the lubricating and protecting fluid in the housing 5 contracts and with it, the bag 11 expands and draws the surrounding well fluid into the bag through the opening 13 to compensate for the loss of volume in the housing 5. Any tendency for the fluid above the centrifugal pressure seal 17, to seep downwardly along the shaft 6 during the contraction of the oil in the housing 5, is overcome by the mechanical seal effected by the rings 24 and 30 which are maintained in sealing engagement by the spring mechanism 32.

In the modified form of the invention shown in Figure 3, the structures of the impeller housing 21 and the impeller 18 are substantially the same as those just described. However, instead of the more or less conventional mechanical seal 29 with its sealing ring 30, the modified form embodies a self contained sealing ring and pressure housing closure. A closure ring 34 replaces the sealing ring 24 of Figure 2 and its central annular recess 35 forms a continuation of the chamber 23 in the housing 21. The closure ring 34 receives the shaft 6 with a rotating clearance and the outer periphery of the ring is held stationary in the bore of the bearing sleeve 7 by means of an O-ring 34a. Within the recess 35 is located a mechanical sealing ring 36 which is spring biased into sealing engagement with the underside of the impeller 18 by means of a coil spring 37 interposed between the ring 36 and the bottom of the closure ring 34. The mechanical sealing ring 36 encircles the shaft 6 with a rotating clearance and is prevented from rotating within the recess 35 by means of an O-ring 36a, interposed between the periphery of the ring 36 and the inner wall of the recess 35.

The operation of this modified form of the invention is essentially the same as that just described except that the sealing effect during the contraction of the oil in the housing 5, is obtained directly between the sealing ring 36 and the underside of the impeller 18.

From the foregoing it is believed that the invention may be readily understood by those skilled in the art without further description, it being borne in mind that numerous changes may be made in the details disclosed, without departing from the spirit of the invention as set forth in the following claims.

I claim:

1. A combined mechanical and centrifugal seal device for a rotary motor shaft running in a motor casing filled with a lubricating and protecting fluid, said device comprising an annular housing coaxial with said shaft, a ring member coaxial with said housing and forming therewith an annular pressure chamber surrounding said shaft, an impeller member fixed to said shaft, running in said chamber, its intake communicating with the fluid in said casing at one end of said housing, a sealing ring surrounding said shaft, fixed against rotation with respect to one of said members and adapted for rotary engagement with a complementary surface on the other of said members, and means normally urging said sealing ring into rotary sealing engagement with said complementary surface, said sealing ring and complementary surface closing off the area within said chamber from escape at the opposite end of said housing.

2. A seal device as claimed in claim 1, wherein said impeller comprises a body fixed to said shaft, having an upstanding annular flange running in said chamber with a peripheral pressure clearance, a series of radial ports in said flange, the clearance between said shaft and said annular member forming a fluid intake passage leading to said chamber on the intake side of said impeller flange.

3. A seal device as claimed in claim 1, wherein said sealing ring is located within said chamber and fixed against rotation with respect to said ring member and engages a complementary surface on said impeller member with a rotary sealing contact.

4. A seal device as claimed in claim 3, including spring means in said chamber normally urging said sealing ring into sealing engagement with the complementary surface of said impeller member.

5. A combined mechanical and centrifugal pressure seal device for a rotary shaft, running in a liquid filled housing, said device comprising an annular member encircling said shaft with a rotary clearance, an annular pressure chamber in said member, communicating with said clearance, an impeller fixed to said shaft for rotation in said chamber, means surrounding said shaft on the pressure side of said chamber, defining a first sealing contact surface, rotatable with said shaft, and means surrounding said shaft defining a second, complementary sealing contact surface, fixed against rotary movement and engageable by said first contact surface with a rotary sealing contact said impeller comprising a body fixed to said shaft, and having an upstanding annular flange running in said chamber with a peripheral pressure clearance, a series of radial ports in said flange, the clearance between said shaft and said annular member forming a fluid intake passageway leading to the chamber on the intake side of said impeller flange.

6. A combined mechanical and centrifugal pressure seal device for a rotary shaft, running in a liquid filled housing, said device comprising an annular member encircling said shaft with a rotary clearance, an annular pressure chamber in said member communicating with said clearance, am impeller fixed to said shaft for rotation in said chamber, a first sealing ring surrounding said shaft with a rotating clearance, fixed against rotary movement, one side of said first ring defining a closure for said chamber, and a second, complementary sealing ring fixed to said shaft for rotation therewith and engageable with the opposite side of said first ring with a rotary sealing contact.

7. A seal device as claimed in claim 6, including spring means normally urging said second sealing ring into sealing engagement with said first sealing ring.

References Cited in the file of this patent

UNITED STATES PATENTS

| | | |
|---|---|---|
| 2,258,527 | Warman | Oct. 7, 1941 |
| 2,331,641 | Walker | Oct. 12, 1943 |
| 2,379,648 | Myers | July 3, 1945 |
| 2,425,209 | Snyder et al. | Aug. 5, 1947 |
| 2,556,393 | Holben | June 12, 1951 |
| 2,610,874 | Payne | Sept. 16, 1952 |
| 2,674,702 | Arutunoff | Apr. 6, 1954 |
| 2,687,907 | Myers | Aug. 31, 1954 |
| 2,738,208 | Mylander | Mar. 13, 1956 |
| 2,752,176 | Ayling | June 26, 1956 |

FOREIGN PATENTS

| | | |
|---|---|---|
| 627,082 | France | May 30, 1927 |